July 16, 1963 W. J. OPOCENSKY 3,097,539
INTEGRATOR DISK BEARING IMPROVEMENT
Filed Jan. 13, 1961 2 Sheets-Sheet 1

INVENTOR
WILLARD J. OPOCENSKY
BY
ATTORNEY

July 16, 1963

W. J. OPOCENSKY 3,097,539

INTEGRATOR DISK BEARING IMPROVEMENT

Filed Jan. 13, 1961

INVENTOR
WILLARD J. OPOCENSKY

BY

ATTORNEY

3,097,539
INTEGRATOR DISK BEARING IMPROVEMENT
Willard J. Opocensky, Glendale, Calif., assignor to General Precision, Inc., a corporation of Delaware
Filed Jan. 13, 1961, Ser. No. 82,465
6 Claims. (Cl. 74—198)

This invention relates to novel and improved integrators and more particularly to an integrator having a novel and improved bearing support for the input disc and its shaft.

Computing integrators, particularly the disc-ball-cylinder type are well known in the art. A specific showing of such integrators is described in Patent No. 2,602,338 to Opocensky and Imm.

One of the major problems encountered in the manufacturing of computing integrators is that of maintaining close tolerances throughout the entire instrument. Small amounts of play caused by poor tolerances, bearing eccentricity or runout is sufficient to produce output inaccuracies that will render the integrator inadequate for analog integrator computations. The radial bearing supporting the input disc and its shaft introduces mechanical problems since its outer race must be mounted in the integrator housing sufficiently tight to prevent canting or toggling of the disc, and yet sufficiently loose so that the compression spring mounted in the disc shaft housing can force the input disc against the transmission balls to prevent slipping between the input disc, the transmission balls, and the output cylinder.

The present invention provides an integrator mechanism of a construction that permits free longitudinal movement of the disc which, when pressured by a compression spring, insures a constant positive frictional drive between the disc, transmission balls and cylinder regardless of their inconstant relative positions. It also provides a bearing construction that precisely maintains the axial alignment yet permits full axial movement of the input disc and prevents toggle or canting action of the disc face.

One object of this invention is to provide an integrator having a bearing guide that permits free reciprocal axial movement of the integrator input disc and yet maintains a precise axial alignment of the disc and shaft.

Another object of this invention is to provide an integrator having means permitting the preloading of the integrator disc radial bearing in such a manner that all radial deflection in the bearing is substantially eliminated.

Another object of this invention is to provide an integrator with adjustable guide bearings to precisely engage and position the radial bearing supporting the shaft of the input disc so that the bearing is free to move along on its axis but which prevents radial deflection of the bearing.

Other objects will become apparent from the following description of a preferred embodiment of the present invention and claims as shown in the accompanying drawings, in which;

Figure 2:
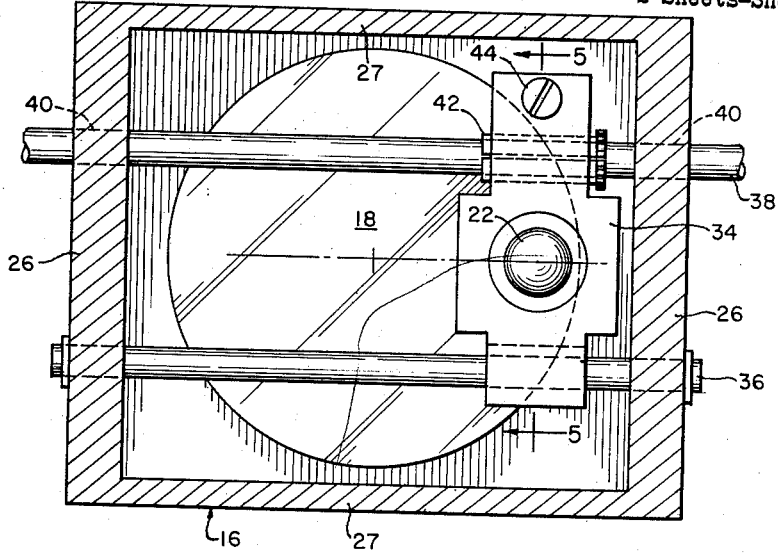
FIGURE 2 shows a sectional view taken on the line 2—2 of FIGURE 1.

Referring now to a detailed description of my invention, the illustrated embodiment of the present invention comprises essentially a housing 16 which provides an enclosure for the input disc 18, an output cylinder 20 and a pair of transmission balls 22 which form a driving engagement between disc 18 and cylinder 20.

Housing 16 comprises a bottom wall 24, side walls 26, front and back walls 27 and a cap plate 25. Bottom wall 24 is provided with a hub extension 28 which contains input disc shaft 46 mounted in radial bearings 48 and 58 and spring 54 which functions to exert pressure against bearing 58 and disc 18 to prevent slipping of balls 22 against cylinder 20.

Cylinder 20 is journaled in a pair of bearings 30 which in turn are mounted in a pair of bored holes 32 in the side walls 26 of housing 16. Cylinder 20 is mounted so that its axis is parallel to the face of disc 18.

Figure 5:
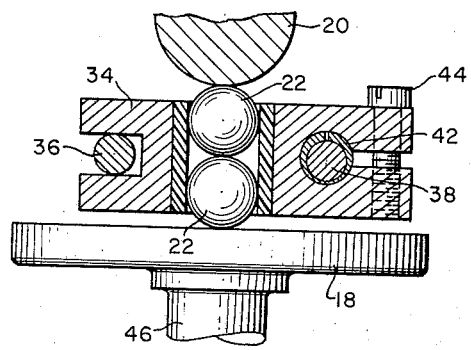
FIGURE 5 is a cross sectional view taken on the line 5—5 of FIGURE 2, illustrating the adjusting means for the ball carriage.

Transmission balls 22 are retained in a ball carriage 34 which is supported between a fixed guide rod 36 and a carriage positioning slide rod 38 as shown in FIGURE 2. Ball carriage 34 is loosely suspended on guide rod 36 and is rigidly secured to slide rod 38 by means of a split eccentric sleeve 42 and a lock screw 44 as illustrated in FIGURE 5. The eccentric sleeve 42 functions to provide a fine lateral adjustment of ball carriage 34 to permit adjustment enabling the center line of balls 22 to pass through the center of disc 18; operation of eccentric sleeve 42 will be discussed in full detail subsequently.

Figure 1:
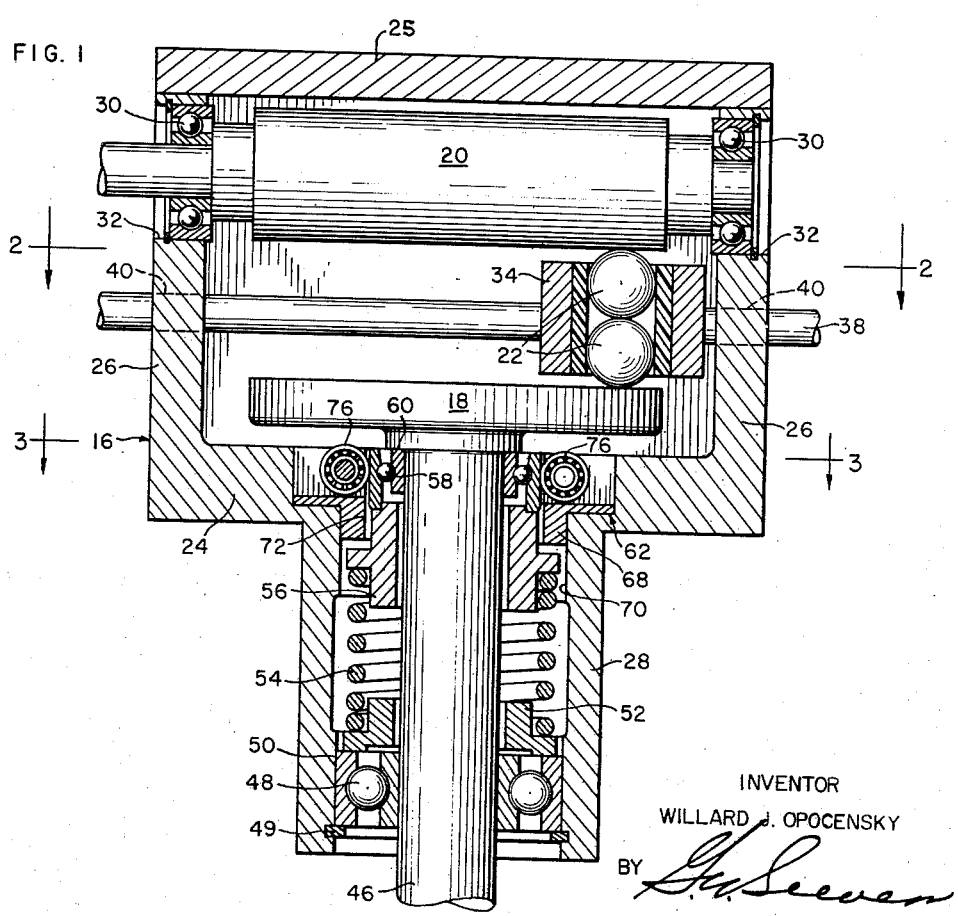
FIGURE 1 shows a longitudinal sectional view through a typical integrator embodying the present invention.

As shown in FIGURE 1, the integrator input disc 18 is provided with a shaft 46 the lower end of which is journaled in bearing 48. Bearing 48 is mounted in a concentric bore 50 and locks into position by a retaining ring 49 seated in an annular groove in hub 28 of housing 16. A spring seat washer 52 engages the outer race of bearing 48 and supports one end of compression spring 54 while the other end of spring 54 bears against a spring follower 56 which in turn is seated against the outer race of upper radial bearing 58.

Even though manufactured to very close tolerances, all radial bearings have a certain amount of radial deflection. As noted previously, any radial deflection caused by bearing eccentricity or runout is sufficient to produce inaccuracies in a computing integrator. In the present invention, radial deflections in bearing 58 have been reduced to an absolute minimum by preloading bearing 58 by applying pressure of spring 54 against the outer race of bearing 58 as shown in FIGURE 1. The compression load of spring 54 is transmitted through spring follower 56, through outer race of bearing 58 and diagonally across the ball bearings of radial bearing 58 into the inner race. Preloading in this manner has been found to produce a bearing with substantially no radial play.

In addition to preloading bearings 58 by applying pressure to the outer race, spring 54 functions to maintain a constant pressure of disc 18 against transmission balls 22. This pressure is necessary in order to prevent slipping between disc 18, balls 22 and cylinder 20.

Heretofore, radial bearing 58 was positioned in a bore with sliding fit thereby permitting a reciprocal motion under compression of spring 54. Because of this sliding fit, it was necessary that this bearing have a small amount of radial deflection. This deflection, while very small, was sufficient to produce a slight inaccuracy in the computation performed by the integrator. This sliding fit of the radial bearing occasionally permitted the outer race of the bearing to rotate, thereby permitting the bearing housing to be worn away and further increasing the radial deflection and the inaccuracies of the integrator.

Some of the problems involved in acquiring and maintaining the accuracies of relationship of these parts of an integrator are: a true cylindrical surface of the cylinder, i.e., no taper end to end, a concentricity of the cylinder portion with its shaft center, runout and eccentricity of the bearings supporting the cylinder and the axial alignment of the cylinder bearings being parallel with the disc surface. The alignment of the path of the axis of the torque transmission balls with the precise center of the disc is also of great importance. One of the greatest problems of integrator design is to produce and maintain a true running surface of the disc face normal to the axis of its input shaft center; also that the precise disc center remain in a constant position and not have a "wobble" such as that caused by a radial bearing with radial play. The foregoing problems have been solved to a great extent by modern improved machining techniques but tolerances are still allowed for practical considerations. To compensate for these tolerances and machining imperfections the present invention provides a means to maintain a precise constant axial position of the disc and at the same time allow free movement of the disc along the axis of its input shaft center.

Figure 3:
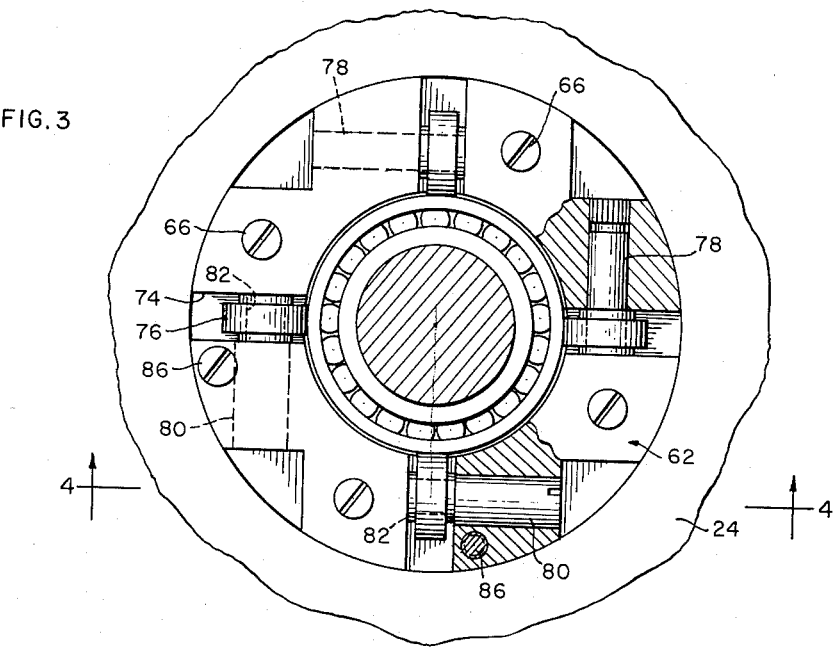
FIGURE 3 shows a sectional view on the line 3—3 of FIGURE 1, illustrating in large detail the construction of the guide bearings.
Figure 4:
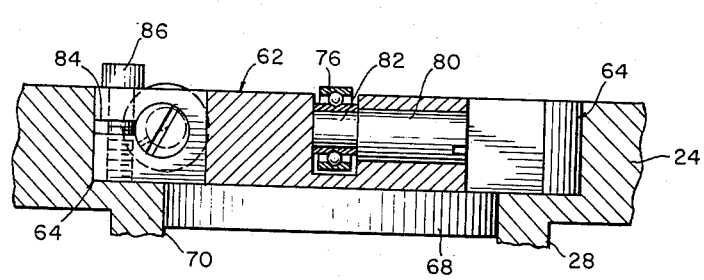
FIGURE 4 is a cross sectional view taken on the line 4—4 of FIGURE 3.

The means to provide the foregoing improvement is a bearing guide support for the radial bearing 58, which is comprised of a collar 62 retained in a counterbore 64 in housing bottom wall 24 and secured in position by a plurality of screws 66 as shown in FIGS. 3 and 4. Collar 62 is provided with an extended concentric boss 68 which closely fits a bore 70 in hub extension 28. Bore 70 and bore 50 are concentrically and axially in alignment. Collar 62 is provided with a concentric bore 72 which is slightly greater in diameter than the outside diameter of bearing 58. Collar 62 is also provided with a plurality of radial slots 74 which accommodates a like number of comparatively miniature guide bearings 76. One pair of bearings 76 are mounted on fixed spindles 78 and another pair of bearings 76 are mounted on adjustable spindles 80. The adjustable spindles 80 are provided with an eccentric end portion 82 which supports the inner race of its associated bearing 76. The adjustable spindles 80 are provided with a kerf to facilitate the rotation thereof. The arrangement of the spindles is such that a fixed spindle and an adjustable spindle are diametrically opposed. The body of the collar 62 is provided with slots 84 adjacent the adjustable spindles 80 and screws 86 to lock adjustable spindles in position.

The assembly of the integrator is accomplished in the following manner: the bearing 48, a spring seat washer 52, compression spring 54 and spring follower 56 are assembled in position in the hub extension 28. Collar 62, with guide bearings 76 assembled in position, is placed on a plug gauge. The outside diameter of the plug gauge is the same as the outside diameter of bearing 58. Adjustable spindles 80 are then rotated so as to bring their associated guide bearings 76 into engagement with the plug gauge, continued rotation will cause such guide bearing 76 and its diametrically opposed fixed spindle bearing to become "preloaded." When the proper amount of "preloading" is accomplished each clamping screw 86 is tightened down locking the assembly in the desired condition. The collar assembly 62 is then positioned in the counter bore 64 and secured in position by screws 66. Radial bearing 58 is press fitted into position on shaft 46 with the end of the inner race engaging the shoulder 60 of the input disc 18. The disc, shaft and bearing assembly is then positioned through the hub extension 28 to a position where the outer race of radial bearing 58 is seated in the spring follower 56.

The remainder of the integrator parts, ball carriage and transmission balls, cylinder and associated parts are then assembled in position.

With all integrator parts in position, ball carriage 34 is adjusted in a plane transversely to the axis of the guide rods 36 and 38 to a position where the precise axis of transmission balls 22 will intersect the precise axis of input disc 18 as clearly shown in FIG. 5. This adjustment is accomplished by rotating the eccentric sleeve 42 on rod 38 to the desired position and locking the ball carriage, eccentric sleeve and rod 38 together by clamping down on screw 44.

It is to be understood that various changes in shape and arrangement of parts can be resorted to without departing from the spirit of this invention as set forth in the following claims.

I claim:

1. An integrator having a rotatable disc, a cylinder rotatable on an axis normal to the axis of rotation of said disc, motion transmission means comprising a movable carriage confining a pair of balls in driving engagement with said cylinder, said disc and each other, a shaft affixed to said disc rotatably supported by a bearing, a plurality of radially disposed bearings circumferentially disposed about said first mentioned bearing and confining said first bearing to a precise axis and adjustment means associated with at least one of said radially disposed bearings for accurately positioning said radially disposed bearings against said first bearing whereby axial movement of said shaft is freely permitted.

2. An integrator according to claim 1 in which said adjustment means is a rotatably adjustable eccentric cam upon which one of said plurality of radially disposed bearings is mounted.

3. An integrator having a rotatable disc, a cylinder rotatable on an axis normal to the axis of rotation of said disc, a pair of torque transmission balls disposed in driving engagement between said disc and said cylinder and each other, said balls supported by a ball carriage adapted to be moved diametrically across the face of said disc and parallel to the axis of said cylinder, a radial bearing having an inner and outer race supporting said disk and a plurality of guide bearings confining said radial bearing to a precise axis engaging the outer race of said radial bearing whereby said radial bearing is capable of movement along its own axis.

4. An integrator according to claim 3 in which at least one of said guide bearings is capable of adjustment in a radial plane through the axis of said radial bearing.

5. An integrator comprising a rotatable disc, a cylinder rotatable on an axis normal to the axis of said disc, a torque transmission means comprising a pair of balls in driving engagement with said disc, said cylinder and each other, a shaft integral with said disc, a pair of radial ball bearings supporting said shaft, the first of said bearings supporting the outboard end of said shaft, the second of said radial bearings supporting said shaft adjacent said disc, a compression spring means having one end bearing against the outer race of said outboard radial bearing, the opposite end of said compression spring means bearing against the outer race of said second radial bearing, the compression force of said spring means being exerted through the balls of said second radial bearing into the inner race of said second radial bearing so as to cause said bearing to be "preloaded," the compression force of said spring means also being adapted to provide a pressure force between engaging surfaces of said disc, pair of balls and cylinder and a plurality of guide ball bearings adapted to engage the outer race of said second radial bearing, the axis of said guide ball bearings being at a right angle to the axis of said shaft whereby axial movement of said shaft is freely permitted.

6. An integrator comprising a rotatable disc, a cylinder rotatable on an axis normal to the axis of said disc, a ball carriage movable in a plane parallel to the axis of said cylinder and parallel to the face of said disc, said ball carriage being adapted to support and confine a pair of torque transmission balls in a common axis normal to the face of said disc, said transmission balls being in driving engagement with said disc, said cylinder and each other, said ball carriage adapted to be supported by a pair of guide rods, the first of said rods being supported in a fixed position and adapted to slidably engage a slot in said ball carriage, the second of said rods being slidably supported and adapted to be secured to said ball carriage, said securing means including an adjustment means comprising an eccentric sleeve embracing said sliding rod and confined within said carriage, said securing means and adjusting means being provided with a locking means to secure said carriage to said sliding rod, said adjusting means on said carriage being adapted to adjust the said common axis of said torque transmission balls with the center of said disc transversely to the axis of said sliding rod, a shaft integral with said disc, a pair of radial ball bearings supporting said shaft, the first of said radial bearings supporting the outboard end of said shaft, the second of said radial bearings supporting said shaft adjacent said disc, a compression spring means having one end bearing against the outer race of said outboard radial bearing, the opposite end of said compression spring means bearing against the outer race of said second radial bearing, the compression force of said spring means being exerted through the balls of said second radial bearing into the inner race of said second radial bearing so as to cause said bearing to be "preloaded," the compression force of said spring means also being adapted to provide a pressure force between engaging surfaces of said disc, pair of balls and cylinder and a plurality of guide ball bearings adapted to engage outer race of said second radial bearing, the axis of said guide ball bearings being at a right angle to the axis of said shaft whereby axial movement of said shaft is freely permitted, at least one of said guide bearings being provided with an adjustment to "preload" said guide bearings.

References Cited in the file of this patent
UNITED STATES PATENTS

| | | |
|---|---|---|
| 867,511 | Karns | Oct. 1, 1907 |
| 1,317,915 | Ford | Oct. 7, 1919 |
| 1,398,417 | Chicken et al. | Nov. 29, 1921 |
| 2,221,176 | Boll | Nov. 12, 1940 |
| 2,881,623 | Eldridge | Apr. 14, 1959 |